United States Patent
Räbinä et al.

(10) Patent No.: US 8,320,819 B2
(45) Date of Patent: Nov. 27, 2012

(54) MOBILE TV CHANNEL AND SERVICE ACCESS FILTERING

(75) Inventors: Ossi Räbinä, Tyrnävä (FI); Petri Hyysalo, Espoo (FI)

(73) Assignee: Nokia Corporation, Espoo (FI)

( * ) Notice: Subject to any disclaimer, the term of this patent is extended or adjusted under 35 U.S.C. 154(b) by 626 days.

(21) Appl. No.: 11/297,662

(22) Filed: Dec. 9, 2005

(65) Prior Publication Data

US 2007/0101352 A1    May 3, 2007

Related U.S. Application Data

(60) Provisional application No. 60/731,938, filed on Nov. 1, 2005.

(51) Int. Cl.
   *H04H 20/71* (2008.01)
(52) U.S. Cl. .................. 455/3.01; 455/414.1; 455/422.1; 725/1; 725/62
(58) Field of Classification Search ............... 455/414.4, 455/414.1, 414.3; 725/1
   See application file for complete search history.

(56) References Cited

U.S. PATENT DOCUMENTS

| | | | |
|---|---|---|---|
| 6,295,057 B1 * | 9/2001 | Rosin et al. ................. 715/744 |
| 6,628,928 B1 * | 9/2003 | Crosby et al. ................. 455/77 |
| 7,506,066 B2 * | 3/2009 | Nobakht et al. ............ 709/245 |
| 2003/0088778 A1 * | 5/2003 | Lindqvist et al. ............ 713/182 |
| 2003/0211856 A1 | 11/2003 | Zilliacus |
| 2004/0252695 A1 | 12/2004 | Rasanen et al. |
| 2004/0253947 A1 | 12/2004 | Phillips et al. |
| 2005/0090235 A1 * | 4/2005 | Vermola et al. ............ 455/414.3 |
| 2005/0101323 A1 * | 5/2005 | De Beer ...................... 455/435.2 |
| 2005/0197964 A1 * | 9/2005 | Duggan ......................... 705/57 |
| 2005/0232209 A1 * | 10/2005 | Buckley et al. ............... 370/338 |

FOREIGN PATENT DOCUMENTS

| | | |
|---|---|---|
| CN | 1342013 A | 3/2002 |
| EP | 0551433 | 7/1993 |
| EP | 1 182 834 A2 | 2/2002 |
| GB | 2407745 A | 5/2005 |
| WO | 0033576 A1 | 6/2000 |
| WO | 03032148 A1 | 4/2003 |
| WO | WO03/032148 | 4/2003 |
| WO | WO03/034735 | 4/2003 |
| WO | WO2004/015917 | 2/2004 |

(Continued)

OTHER PUBLICATIONS

U.S. Appl. No. 10/917,700, filed Aug. 18, 2004.

(Continued)

*Primary Examiner* — Vladimir Magloire
(74) *Attorney, Agent, or Firm* — Ditthavong Mori & Steiner, P.C.

(57) ABSTRACT

Provided are apparatuses and methods for transmitting and receiving ESG fragments containing identification information. In one example, the identification identifies a mobile operator. For example, the identification information may include a Mobile Network Code (MNC), Mobile Country Code (MCC), or name corresponding to the mobile operator. In another example, the identification information may also contain a web address corresponding to a web page associated with the mobile operator. For example, the identification information received in the ESG fragment may be compared to stored identification information at a receiver. Based on the identification information in the ESG fragment and stored identification information, a corresponding web page may be provided. Also, a program or service corresponding to the ESG fragment may be filtered based on the identification information in the ESG fragment and stored identification information.

31 Claims, 10 Drawing Sheets

FOREIGN PATENT DOCUMENTS

| WO | WO 2005/045603 A2 | 5/2005 |
|----|-------------------|--------|
| WO | WO 2005/045735 A1 | 5/2005 |
| WO | 2006097847 A1 | 9/2006 |

OTHER PUBLICATIONS

Open Mobile Alliance, Service Guide for Mobile Broadcast Services, Draft Version 1.0, OMA-TS-BCAST_ServiceGuide—V1_0_0-20050818-D, Aug. 18, 2005.

"ESG Datamodel Comparison between OVA BCAST and DVB CBMS", Aug. 22, 2005, Open Mobile Alliance Ltd, retrieved from the internet Mar. 25, 2009, http://member.openmobilealliance.org.

Russian Office Action on Application No. 2008116875/09 (019252) dated Apr. 1, 2009, 3 pages.

Chinese Office Action for corresponding CN Application No. 200680039804.6, Jul. 24, 2009, China.

Chinese Office Action for corresponding CN Application No. 200680039804.6, Jan. 22, 2010, China.

Russian Office Action for corresponding RU Application No. 2008116875/09(019252), Jan. 28, 2010, Russia.

International Preliminary Report on Patentability for corresponding International App. No. PCT/IB2006/003001 dated May 6, 2008, pp. 1-9.

International Search Report and Written Opinion for corresponding International App. No. PCT/IB2006/003001 dated Apr. 2, 2007, pp. 1-8.

Korean Office Action for corresponding KR App. No. 10-2008-7010516, May 31, 2010, Korea, pp. 1-5.

Russian Office Action for corresponding RU App. No. 2008116875/09(019252), May 21, 2010, Russia, pp. 1-6.

Korean Office Action for corresponding Application No. 10-2008-7010516, Nov. 30, 2009, Korea.

DVB Organization, "IP Datacast over DVB-H: Electronic Service Guide," TM 3348 Rev. 1, European Telecommunications Standards Institute, Sep. 2005.

European Office Action for corresponding EP Application No. 06820808.1-2223/1943836, May 30, 2011, pp. 1-7.

Supplementary European Search Report for corresponding EP Application No. 06820808.1-2223/1943836, May 18, 2011, pp. 1-3.

Berners-Lee, T., et al.: Uniform Resource Identifier (URI): Generic Syntax. Network Working Group, Request for Comments (RFC) 3986, Jan. 2005, pp. 1-45, http://www.apps.ietf.org/rfc/rfc3986.html.

Russian Office Action for corresponding RU Application No. 2008116875/09(019252), Sep. 2, 2009, Russia.

* cited by examiner

MOBILE TV CHANNEL AND SERVICE ACCESS FILTERING

This application claims the benefit of U.S. Provisional Application 60/731,938, filed Nov. 1, 2005, which is incorporated herein in its entirety.

FIELD OF THE INVENTION

The invention relates generally to communications networks. More specifically, the invention relates to interactive services in communication networks.

BACKGROUND OF THE INVENTION

Generally, an Electronic Service Guide (ESG) enables a terminal to obtain information relating to what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast programs. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). ESG fragments may also be transmitted by using Asynchronous Layered Coding (ALC) and File Delivery over Unidirectional Transport (FLUTE) protocols. Data is often transmitted through the Internet addressed to a single user. It can, however, be addressed to a group of users, commonly known as multicasting. In the case in which the data is addressed to all users it is called broadcasting.

In addition, television content and programs may be delivered to a subscriber with a corresponding Electronic Service Guide (ESG). A mobile network may be used for receiving TV programs or browsing the Internet at a subscriber terminal or receiver from a mobile operator. However, when the mobile operator provides television specific information on a web page, the address of the web page also has to be provided. A user or subscriber desiring access to the web page must enter the web address corresponding to the web page.

In this case, subscribers must manually enter input such as a web address into the system in a non-uniform manner. If the user erroneously inputs the wrong data, the wrong data will be received which may result in undesired results. For example, the subscriber may send a non-functional web address which does not produce desired results. This can be inconvenient for the user as the web address may be long and cumbersome and difficult to remember. Hence, there is a high risk of errors in data input resulting in unsuccessful service in such a system. Moreover, there is no standardized method of specifying web address information.

Also, the web page address may have been updated, moved or otherwise altered in which case the subscriber may be unsuccessful in gaining access to the desired web page even if the web address were properly entered.

In addition, there are many types of television channel content and associated services. A user may receive any number of television programs or services even if such programs or services are undesired. With the explosion in the number of available programs and services, which includes interactive services, the user may become overwhelmed and confused by the seemingly endless variety of programs/services available. In some cases, even the availability of certain programs or services may be undesired, such as programs or services that are deemed unsuitable for certain family members.

Therefore, there is a need for a method and system for providing up-to-date information on mobile operators or service providers and corresponding address and link information for the mobile operators or service providers. There is also a need to provide a method and system for providing a dynamic web-link that remains current. Further, there is a need for a method and system for providing identification information for a mobile operator or service provider in a convenient manner. There is also a need for a method and system for filtering television content for receipt at a subscriber terminal or receiver.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example, a method is provided for identifying a mobile operator in a communication network. For example, a parameter, attribute, or element for identifying the mobile operator may be included in an ESG fragment. The identification information may include a Mobile Country Code (MCC) and or Mobile Network Code (MNC).

In one example, the identification information may be compared to stored identification information. Based on the comparing, a program or service associated with the ESG fragment may be filtered at the receiver or subscriber terminal. The identification information may be stored in any location in the receiver or terminal. In one example, the stored identification information may be stored in a SIM card at the receiver or subscriber terminal.

In another example, a web address corresponding to a web page associated with an identified mobile operator is included in an ESG fragment. The web address may correspond to an identified mobile operator, the identified mobile operator identified in an ESG fragment. The mobile operator may be identified in the ESG fragment through a parameter, attribute, or element. For example, identification information may include an MCC and/or MNC code corresponding to the mobile operator.

In another example, a transmitter is provided for transmitting an ESG fragment, the ESG fragment containing identification information for a mobile operator. The identification information may include, for example, an MCC and/or MNC code corresponding to the mobile operator.

In another example, a receiver is provided for receiving an identifier for a mobile operator and a corresponding web page address. The receiver may further include a memory for storing identification information for mobile operators. The memory may be anywhere in the receiver or terminal and may take many forms. For example, the identification information may be stored in a SIM card. The receiver may further request a web page corresponding to the identified mobile operator based on the identification information in the memory and the identification information received in an ESG fragment.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
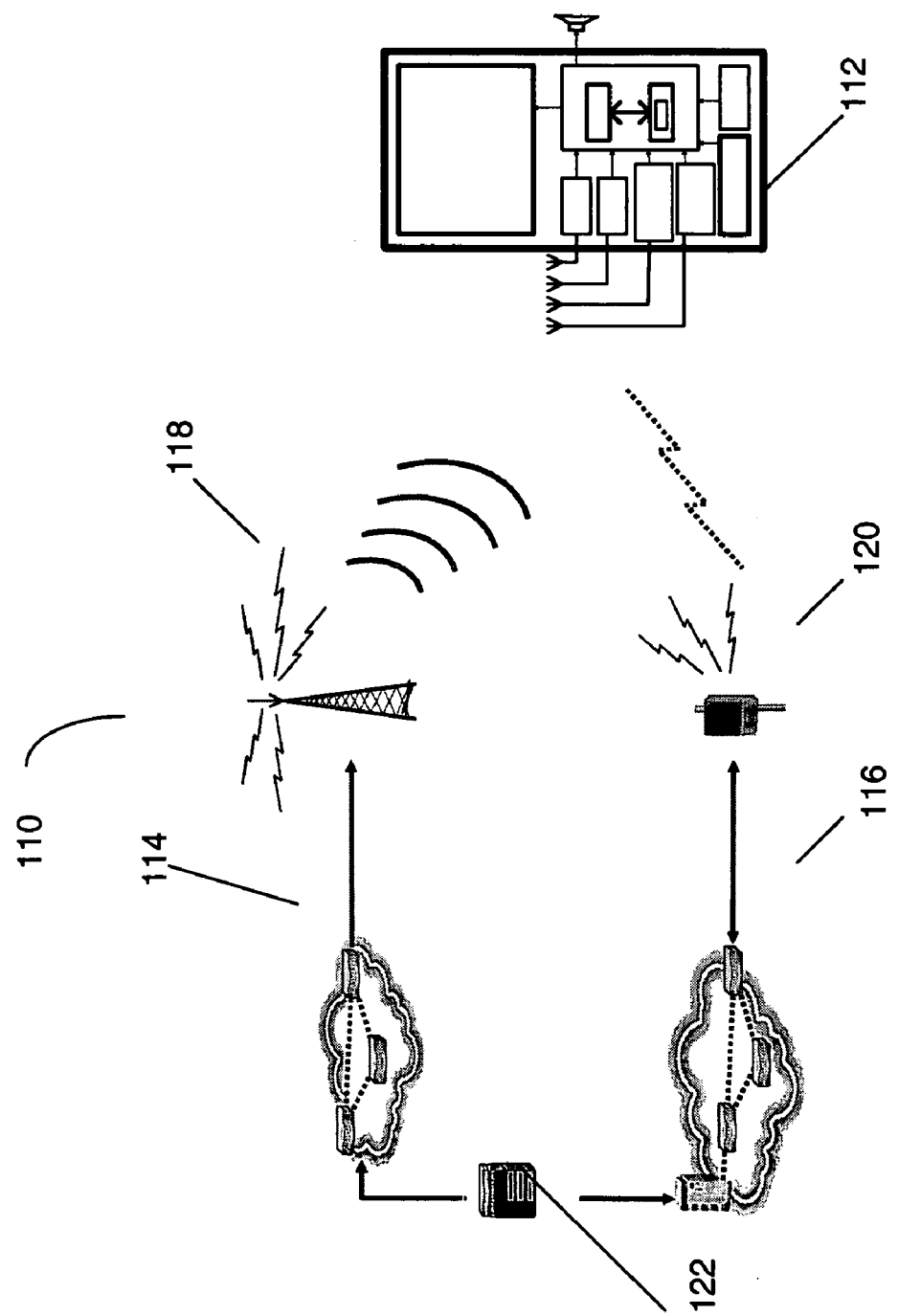
FIG. 1 illustrates a block diagram of a wireless communication system in which various aspects of the present invention may be implemented.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

One way of broadcasting data is to use an IP data casting (IPDC) network. IPDC is a combination of digital broadband broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is digital video broadcasting-handheld (DVB-H), a recently developed technology that increases the capabilities and services available on small handheld devices, such as mobile telephones. DVB-H is designed to deliver data to wireless terminal devices taking into consideration the characteristics of battery-powered devices.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

An aspect of the invention is also applicable, however, is also applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

ESG fragments may be efficiently transported to a receiver through the formation of containers. In this sense, a container comprises at least one ESG fragment, but may contain a plurality of fragments. Alternatively, a fragment may be carried in more than one container. The containers are transported to the receiver, for example, by using Asynchronous Layer Coding (ALC)/Layered Coding Transport (LCT) such that a single ALC/LCT transport object corresponds to a single container. The fragments can be utilized by the receiver upon reception of the entire container. Aspects of the present invention utilize a simple and extensible header structure apart from the fragments independent of the type and format of the individual fragments. In further embodiments, compression is applied over the entire container, including the fragments and any headers. In yet further embodiments, other envelopes, such as, e.g., a 3GPP metadata envelope may be carried within the container without the need for unnecessary repetition of parameters, such as for example, version, validity time, and identification.

Metadata within a 3GPP (3rd Generation Partnership Project) envelope or in any other form may include specific channels, specific programs, and/or specific channel bundles. Other types of metadata may include: package data, purchase data, such as operator identity data and technical data for performing the transaction, e.g., an address, protocol, price data which may be based upon package/day, channel/minute, program/minute; channel data, such as a textual description for a user, content provider branding information/logo, classification and rating data, such as genre and parental rating, channel SDP data, such as a description of capabilities needed to use the service, e.g., audio and video format and bit rate information, start and end time, addresses, addresses of synchronized auxiliary data feeds, proprietary extensions; and program data, such as a textual description for a user, start and end times, references for interactive services related to the program. This metadata may be loaded by an operator or may be performed automatically.

An aspect of the invention is also applicable and may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. Although mobile devices are described, the present invention is not so limited. For example, aspects of the present invention may be provided in stationary devices. In an example of a stationary device, a backchannel for contacting the service providing entity may further be provided. The mobile terminal/device 112 may comprise a digital broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, AM/FM radio service providers, SMS/MMS push service providers, Internet content or access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation/fourth-generation (2G/3G/4G) cellular data communications network, a Global System for Mobile communications network (GSM), OMA broadcast networks, FLO, MBMS, or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
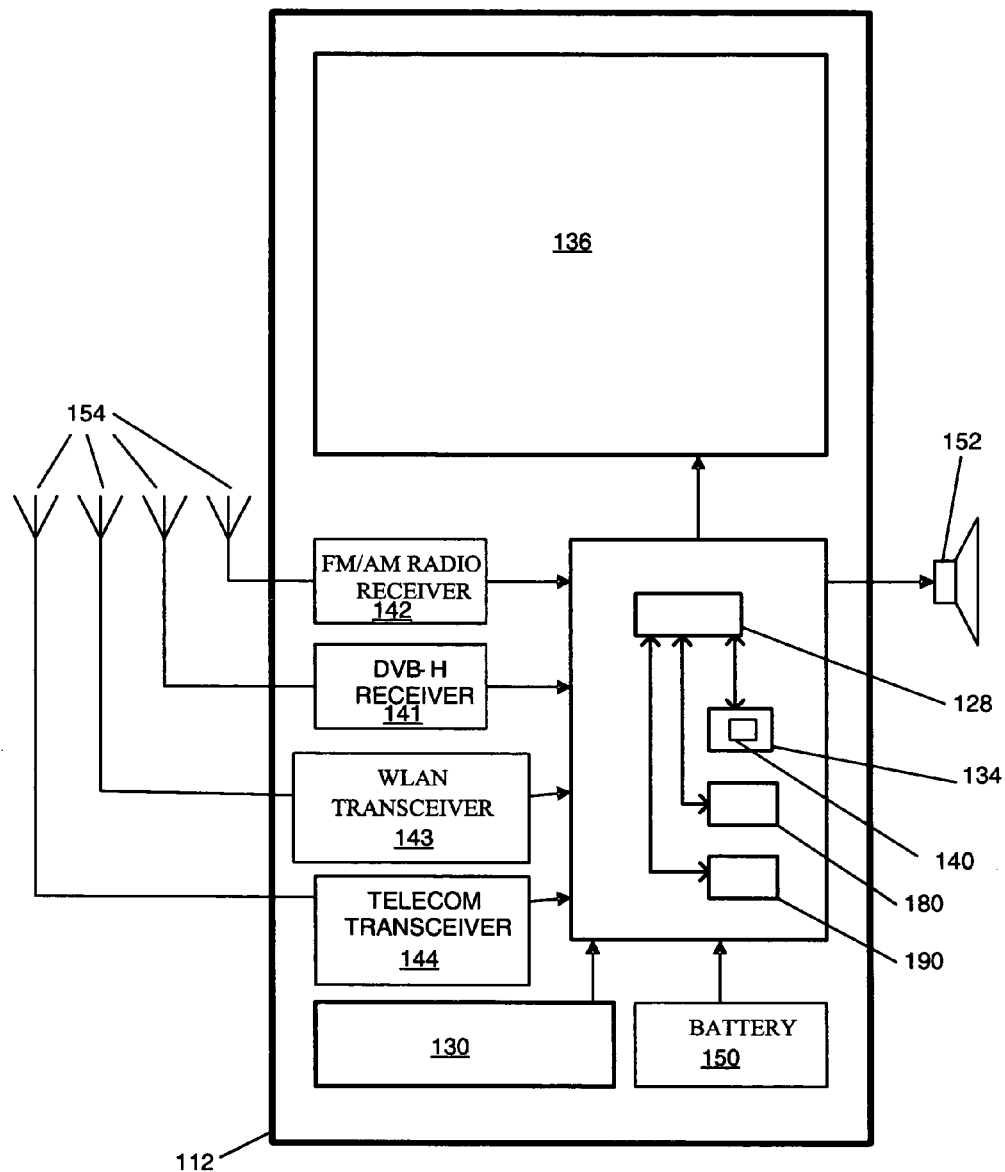
FIG. 2 illustrates a block diagram of a mobile terminal in accordance with an aspect of the present invention.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, data glove, mouse, roller ball, touch screen, or the like. In addition, the mobile device 112 may include a parsing module 180 for receiving information in a service guide (i.e., ESG fragment) and parsing the information to determine elements, sub-elements and attributes for compiling a service/interaction offering or message template. Also, the mobile device 112 may include a template compiler 190 for compiling a message template based on the attributes or sub-elements in the ESG fragment.

Computer executable instructions and data used by processor 128 and other components within mobile device 112 may be stored in a computer readable memory 134. The memory may be implemented with any combination of read only memory modules or random access memory modules, optionally including both volatile and nonvolatile memory, wherein some of the memory modules may be detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process transmissions based on the Digital Video Broadcast (DVB) standard, such as DVB-H or DVB-MHP, through a specific DVB receiver 141. Additionally, receiver device 112 may also be configured to receive, decode and process transmissions through FM/AM Radio receiver 142, WLAN transceiver 143, and telecommunications transceiver 144. Further the mobile device may be configured to receive transmissions based on the Digital Audio Broadcasting (DAB) standard (not shown). In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmissions based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Figure 3:
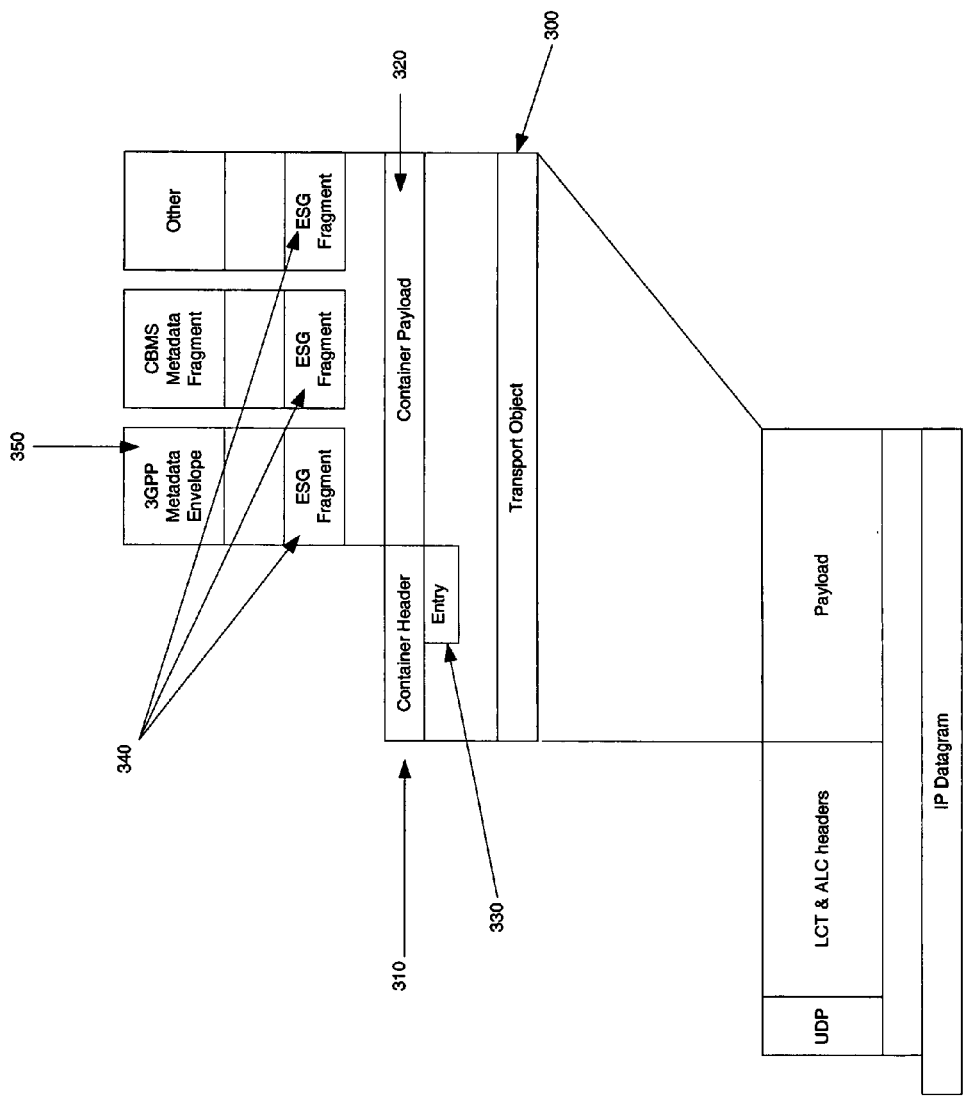
FIG. 3 illustrates a schematic diagram of an example transport object in accordance with an aspect of the present invention.

FIG. 3 is a schematic diagram of an example transport object in accordance with at least one aspect of the present invention. Generally, a single transport object 300 comprises a container header 310 and a container payload 320. By incorporating the header 310 and the payload 320 into a single transport object 300, there is no longer a need to recombine each header with the information regarding where each container is located within different transported objects. Furthermore, there is no longer an issue of which to transmit first, as presented in previous systems. The container header 310 may contain configuration information regarding the header and/ or the container payload 320. In one embodiment, the header 310 is coded to inform a receiver of the entry length of the header.

In the exemplary embodiment, the header 310 may have a plurality of ESG fragment descriptor entries 330 that identify the ESG fragments 340 in the container payload 320 so that the receiver may determine the exact position and/or length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries 330, an ESG fragment 340 or a mixture thereof. In one exemplary embodiment, the association of a 3GPP metadata envelope with an ESG fragment 340 may substitute for, or negate the need of additional metadata to be located in the header 310 in relation to that particular ESG fragment.

In one example of the present invention, an ESG fragment may contain identification information corresponding to a mobile operator. For example, the mobile operator may be a service provider for Mobile television. The identification information can be provided and detected/displayed to a subscriber or user of a terminal. This information may also be provided through metadata associated with the ESG fragment. For example, information identifying a mobile operator can be mapped into metadata of an ESG fragment as a predetermined element. A subscriber terminal can parse this information to determine the identity of the mobile operator.

Thus, according to an example embodiment of the present invention, mobile operator identification information or other form of a pre-configured message can be delivered in an ESG fragment of a service guide. Such messaging may be transmitted in a variety of ways such as but not limited to Short Message Service (SMS), Multimedia Message Service (MMS) or E-mail, to name a few.

An ESG fragment containing data for identifying a mobile operator may include corresponding identification information of a mobile operator such that a web address corresponding to the mobile operator may also be identified. In this example, the ESG data delivered at a subscriber terminal or receiver may include mobile operator specific identification information and/or corresponding web page address information. The information may be stored in any desired location. For example, the information may be stored in a memory within the receiver or subscriber terminal. In one example, the subscriber terminal or receiver may contain a Subscriber Identification module (SIM) card which may store the identification information for the mobile operator. In one example, the ESG fragment containing the identification information for the mobile operator and corresponding web address information is received at the subscriber terminal or receiver. The subscriber terminal or receiver may identify the mobile operator based on the corresponding identification information stored at the receiver or subscriber terminal (e.g., the information may be stored in the SIM card). Based on the identified mobile operator, the corresponding web page address may be obtained from the ESG fragment. Updates to the mobile operator identification codes may be performed on new SIM cards, for example.

The identification information for a mobile operator may take many forms. For example, a mobile operator may be identified by data provided in an IMSI (International Mobile Subscriber Identity). This information may be marked or stored in memory such as but not limited to on a SIM card as described above. The information may also be provided in an ESG fragment such that the identification information received in an ESG fragment at a subscriber terminal or receiver may be compared to corresponding information in memory. The IMSI may contain multiple components such as, for example, a Mobile Country Code (MCC) and/or a Mobile Network Code (MNC). Thus, a mobile operator may be identified via a specific value of any component of the IMSI. In one example, the MCC component of the IMSI may be a 3 digit code. Also, the MNC component of the IMSI may be a 3 digit code, a 2 digit code or a one digit code, for example.

In addition, the mobile operator may be identified by a unique name. The name may be selected by the mobile operator and provided in ESG data. In this example, the identity of the mobile operator is determined based on the name, MCC and/or MNC corresponding to the mobile operator. The data may be included in an ESG fragment delivered to a subscriber terminal or receiver.

Also, the ESG may include information on a web address corresponding to the identified mobile operator. For example, the mobile operator may be a Mobile television provider with a corresponding web address. A user or subscriber may wish to access the web page of the web address corresponding to the identified mobile television provider. In this example, the web address corresponding to the identified mobile television provider is provided in an ESG fragment with corresponding identifying information such as a name of the mobile operator, the MCC and/or the MNC.

The web addresses may be included in ESG fragment delivery in a variety of ways. For example, a purchase channel may be used such that a "media title" may contain an HTML web page for offline browsing. For example, the media title may contain a zipped HTML web page for offline browsing. In this example, the zipped HTML web pages may enable local browsing. Alternatively, an extension URL may be used which may point to a cellular operator's web page. Hence, the right media title or extension URL may be selected from a plurality of media titles or extension URLs, respectively, based on the identification of a mobile operator in memory (e.g., a SIM card).

Figure 4:
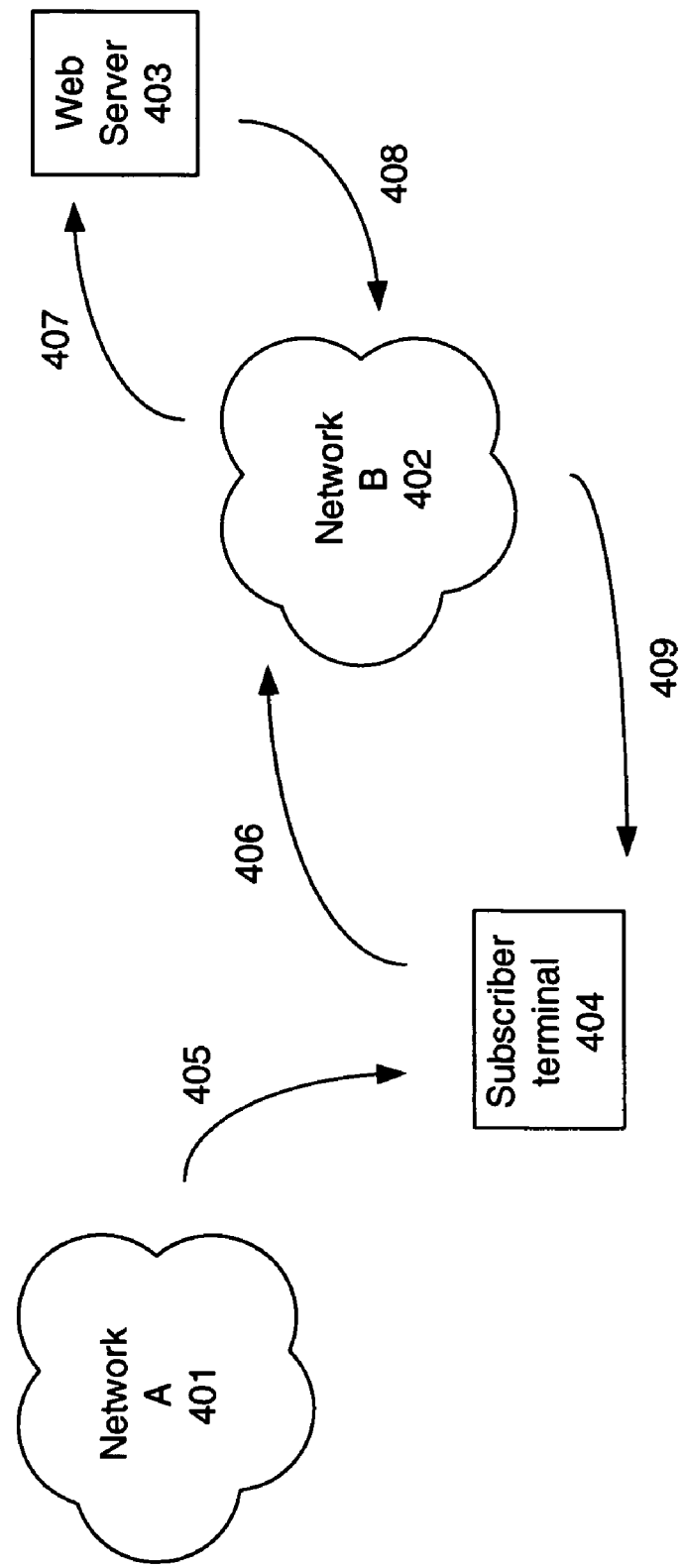
FIG. 4 illustrates an example of identifying a mobile operator and a web address corresponding to a web page associated with the mobile operator in accordance with an aspect of the present invention.

FIG. 4 illustrates an example of identifying a mobile operator at a subscriber terminal. In this example, a service provider or mobile operator in a first Network A 401 may provide ESG data to a subscriber terminal 404. Network A may be any type of network for data communication. In one example, Network A 401 is a DVB-H network. As illustrated in FIG. 4, the ESG data may be provided to terminal 404 (path 405). The ESG data may include, for example, information identifying the mobile operator. In one example, the ESG data contains an MNC and an MCC identifying the mobile operator. Also, the ESG data may further contain a unique name for the mobile operator. In addition, the ESG data may also contain a web page address corresponding to the mobile operator.

The subscriber terminal 404 may contain identification information for the mobile operator. For example, the subscriber terminal 404 may contain a SIM card 410 that may contain the identification information such as a corresponding MNC and/or MCC for the mobile operator. The ESG data or ESG fragment may be received at the subscriber terminal 404 via path 405 such that the subscriber terminal 404 may also receive the mobile operator identification information to identify the mobile operator. In addition, the ESG fragment may contain the web address of the web page corresponding to the mobile operator. Hence, the subscriber terminal 404 may also receive the web address of the web page for the mobile operator via the ESG data or fragment which may be matched or compared to the identified mobile operator.

The subscriber terminal 404 may request a web page from the web server 403 by sending a request 406 via a network (e.g., Network B 402). The subscriber terminal 404 thus requests a web page based on the web page address received in the ESG fragment from the mobile operator. The request for the web page may be transmitted to the web server 403 from the subscriber terminal 404 via Network B 402. Network B may be any type of communication network. In one example, Network B 402 is a GSM Network.

The web server 403 receives the request for a web page 407 and transmits the web page in response to receiving the request 408. The requested web page may be sent to the subscriber terminal 404 from the web server 403 via Network B 402 or other network capable of transmitting data. Thus, the requested web page may be delivered from the web server 403 to the subscriber terminal 404 (e.g., over path 409).

In another example of the present invention, a subscriber terminal or receiver may filter programs or services based on information received in a corresponding ESG. In this example, the ESG may include identification information corresponding to a mobile operator. The identification information may likewise be included in memory at the subscriber terminal or receiver. In one example, the identification information is stored in a SIM card at the subscriber terminal or receiver. In another example, the subscriber terminal or receiver receives information in an ESG without filtering such that operator specific content may be filtered from the whole ESG. In this example, the subscriber terminal or receiver receives the whole ESG without filtering and the ESG may contain operator identification information. For example, the operator identification information may be included in the ESG as metadata information.

Based on the identification information received in the ESG and the corresponding identification information stored in memory (e.g., SIM card) at the subscriber terminal or receiver, the corresponding TV channel content, program or services may be received at the subscriber terminal or receiver or may not be received. In this example, the program or services may be filtered, if desired, such that the program or service is not presented at the subscriber terminal or receiver. In this way, programs or services may be delivered to selected subscriber terminals or receivers while not being delivered to subscriber terminals or receivers that are not to receive the program or service.

Figure 5:
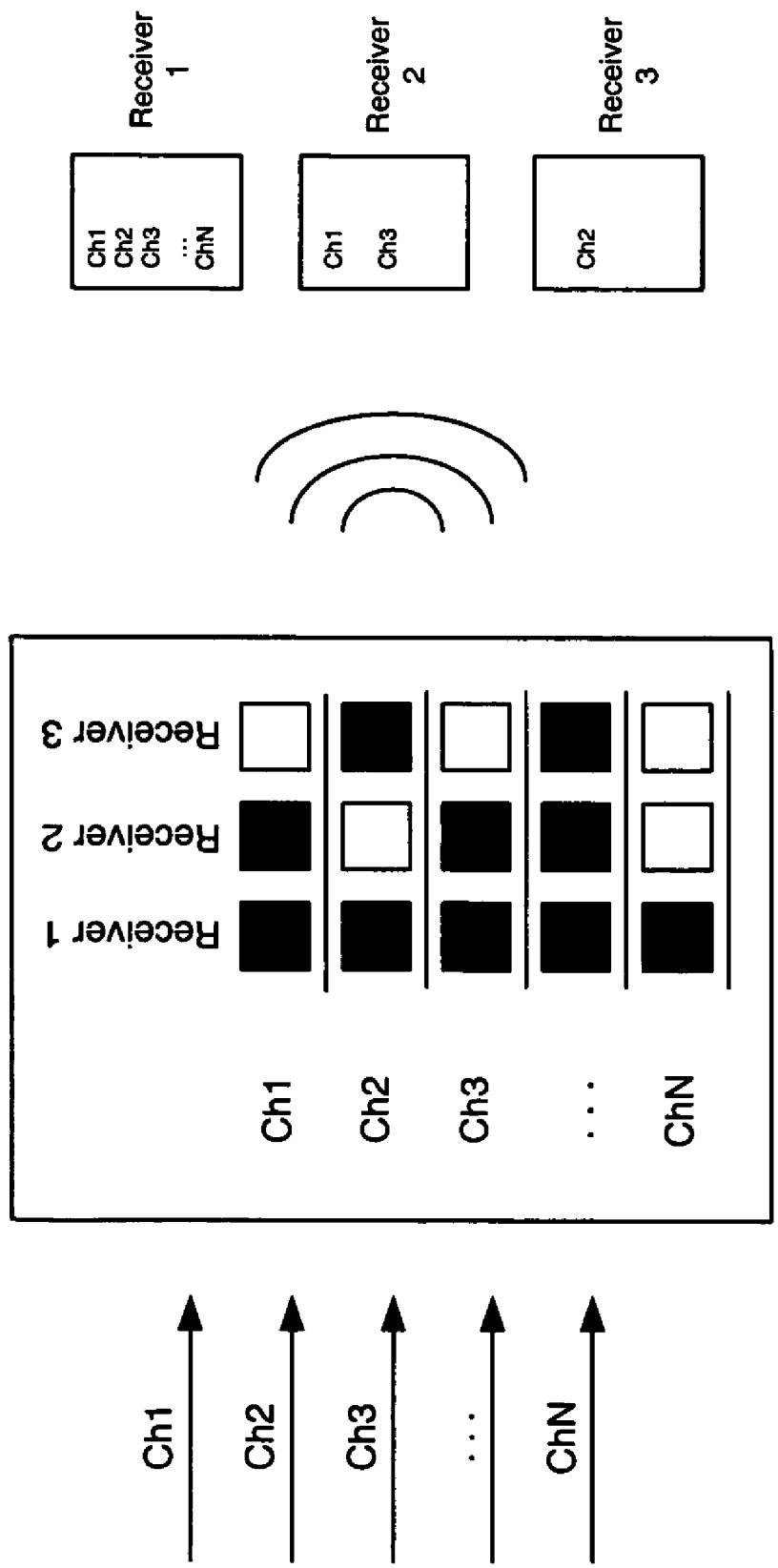
FIG. 5 illustrates an example of filtering of programs or services in accordance with an aspect of the present invention.

FIG. 5 is a diagram illustrating an example of filtering of program or services at a subscriber terminal or receiver. In this example, program or service content is transmitted over various channels. As illustrated in FIG. 5, N channels are provided (Ch1, Ch2, . . . ChN). A corresponding ESG fragment may be transmitted that contains identification information pertaining to the mobile operator or program or service content. In one example, the subscriber terminal or receiver may contain identification information corresponding to mobile operators, programs or service content that may be received at the subscriber terminal or receiver. Based on the presence of the corresponding identification information in memory at the subscriber terminal or receiver, the program or service may be received. For example, if the corresponding identification information is stored in memory at the subscriber terminal or receiver, then a match may be detected between the stored identification information and the identification received in the ESG. In one example, the identification information may be stored in a SIM card at the receiver or subscriber terminal. Thus, it may be determined based on the match that the program or service may be received and presented or displayed at the subscriber terminal or receiver.

In another example, an ESG fragment containing identification information for identifying an operator, program or service content may be transmitted to a receiver or subscriber terminal. In this example, the receiver or subscriber terminal does store identification information. Instead, other identification information may be used at the receiver or subscriber terminal to identify an operator or a program or service content. As one non-limiting example of other identification information, cellular network identification information may be used at the receiver or subscriber terminal. In this example, the receiver or subscriber terminal does not have a SIM card but uses network identification to identify the operator. Thus, based on the identification information received in the ESG fragment and the cellular identification information, the operator may be identified at the receiver or subscriber terminal. In this example, an operator or program or service content may be identified at a subscriber terminal or receiver even if the user of the subscriber terminal or receiver travels to different areas. In this case, a user that is roaming (travels to another country or district, for example) may still filter programs or services according to a new selected mobile network.

In an alternative example, identification information may be received at a subscriber terminal or receiver, the identification information being contained in an ESG fragment. The identification information received in the ESG fragment may be compared to stored identification information in memory (e.g., a SIM card) at the subscriber terminal or receiver. If a match is found in this alternative example, the corresponding program or service is filtered and is not presented or displayed at the subscriber terminal or receiver. Conversely, in this example, if a match is not found between the identification information received in the ESG fragment and any identification information stored in memory (e.g., the SIM card) at the subscriber terminal or receiver, then the program or service may be presented or displayed at the subscriber terminal or receiver.

In the example illustrated in FIG. 5, three receivers are illustrated (receiver 1, receiver 2, and receiver 3). Each of the receivers has a corresponding SIM card for storing identification information. N channels are transmitted to each of the receivers, each of the N channels transmitting a corresponding program or service. Receiver 1 has a SIM card that stores identification information corresponding to programs or services on all N channels as illustrated in FIG. 5. Therefore, receiver 1 may receive and present or display all programs on all N channels.

Also illustrated in FIG. 5 is receiver 2 that has a SIM card storing identification information corresponding to programs or services on Channel 1 and Channel 3.

However, the SIM card at receiver 2 does not store identification information corresponding to programs or services on any of the other channels. Therefore, programs or services transmitted on channel 2, channel 4, . . . channel N are filtered at receiver 2 and are not presented or displayed at receiver 2.

Likewise, receiver 3 illustrated in FIG. 5 has a SIM card that stores identification information that corresponds only to programs or services transmitted on channel 2.

Therefore, only programs or services transmitted on channel 2 may be received and presented or displayed at receiver 3. Programs or services transmitted on channels 1, 3, . . . , N are filtered and are not presented or displayed at receiver 3.

Figure 6A:
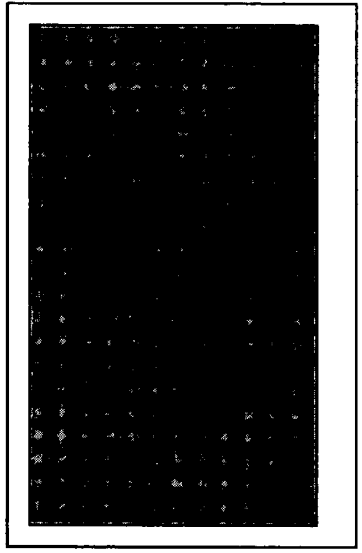
FIGS. 6A-6D illustrate examples of a receivers or subscriber terminals receiving programs or services in accordance with an aspect of the present invention

FIGS. 6A-6D illustrate examples of receivers that receive program or services from a mobile operator. In the example illustrated in FIG. 6A, an exclusive program is displayed at the receiver, the receiver being authorized to receive the exclusive programming. The exclusive program may be provided exclusively to a group of receivers that have been authorized to receive the program. For example, an operator may aggregate the corresponding exclusively for the group of authorized receivers. In FIG. 6A, the receiver is an authorized receiver (i.e., authorized to receive the programming). Therefore, the receiver in FIG. 6A receives and displays the exclusive program on the display as illustrated.

Figure 6B:
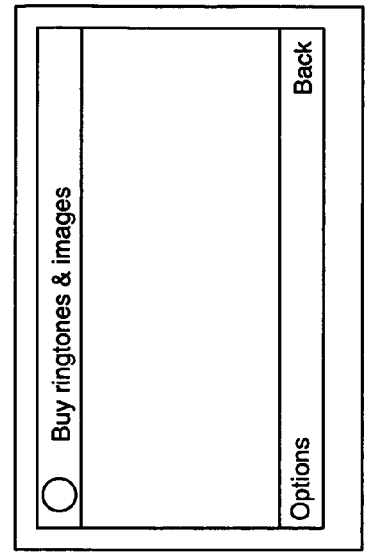

FIG. 6B illustrates an example of a receiver that is not authorized to receive the exclusive program or service provided. In this example, an exclusive program such as the program transmitted in the example illustrated in FIG. 6A is transmitted to the receiver. A corresponding ESG may be transmitted to the receiver, the ESG containing identification information corresponding to the mobile operator or the program or service provided. The receiver illustrated in FIG. 6B may compare the identification information received in the ESG fragment with stored identification information in a SIM card at the receiver. If a match is found, the corresponding program or service may be displayed or otherwise provided at the receiver. However, in the example illustrated in FIG. 6B, a match is not detected (i.e., the identification information received in the ESG fragment is not stored in the SIM card at the receiver illustrated in FIG. 6B). Therefore, the program or service is not received as indicated by the blank screen illustrated in FIG. 6B. Alternatively, the screen may not be blank but may contain any desired display. For example, a display indicating that the program or service is unavailable or access has been denied may be provided.

Also, services may be provided over non-exclusive channels. As one example to illustrate, MTV may broadcast a program on the Music Channel TV. A first mobile operator may provide special voting services for certain viewers, for example, customers of the service. The first mobile operator may thus provide, for example, a service associated with a provided program in which customers may cast a vote for a presented activity (e.g., favorite singer, favorite video, etc.). However, individuals who are not customers of the service are not permitted to cast a vote. Also the first mobile operator may not wish for those who are not customers to receive and display the voting service provided.

At the same time in this example, a second mobile operator may provide a purchase service in which customers may order items during the program. For example, a customer of the purchase service may download a ringtone or may download certain images from the second mobile operator. However, in this example, those individuals who do not participate in the purchase service may not download the content provided. Thus, in this example, the second mobile operator desires that only those individuals or subscribers who are authorized to receive the purchase service or offers are provided with access to the service. For those subscribers who do not participate in the purchase service offered by the second mobile operator, the service is filtered such that those non-participating subscribers do not receive and display the service.

Figure 6C:
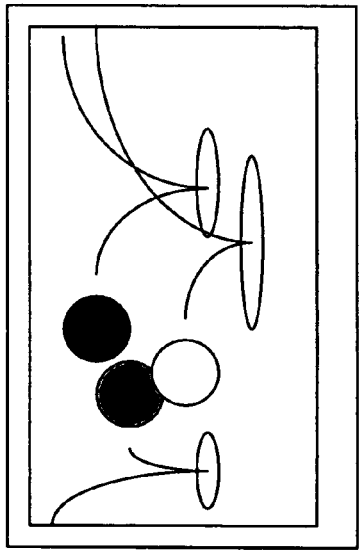

FIG. 6C illustrates a subscriber terminal or receiver in which the receiver is authorized to receive the service offered by the first mobile operator. In this example, the first mobile operator provide the voting service as described and the receiver illustrated in FIG. 6C receives and displays the service for the user. Thus, in this example, identification information corresponding to the service or the first mobile operator is received in an ESG fragment at the subscriber terminal or receiver. The received identification information is compared to corresponding identification information stored in memory (e.g., a SIM card) at the subscriber terminal or receiver. A match is found in this example, and the corresponding service (voting service in the example) is provided at the receiver.

However, the second mobile operator offers the purchase service but the terminal illustrated in FIG. 6C is not authorized to participate in the purchase service. Hence, the purchase service is not provided at the receiver. For example, an ESG fragment may contain identification information corresponding to the second mobile operator or the services provided by the second mobile operator. In this example, the received identification information corresponds to the purchase service provided by the second mobile operator. The received identification information is compared to stored identification information, for example, in a SIM card at the receiver. In this example, matching identification information is not stored in the SIM card at the receiver. Therefore, the purchase service is not received and provided at the receiver in the example illustrated in FIG. 6C.

Figure 6D:
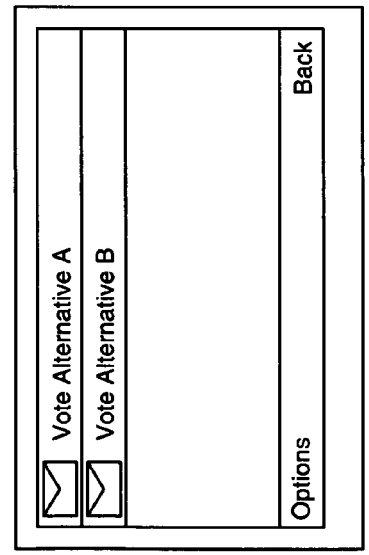

FIG. 6D illustrates an example of a receiver that is authorized to participate in the purchase service. In this example, an ESG fragment is received at the receiver, the ESG fragment containing identification information corresponding to the second mobile operator or the purchase service from the second mobile operator. The identification information thus received at the receiver is compared to identification information stored in the SIM card at the receiver. In this example, a match is found such that the purchase service may be received and displayed or provided at the terminal. FIG. 6D illustrates the purchase service displayed at the authorized receiver.

Figure 7:
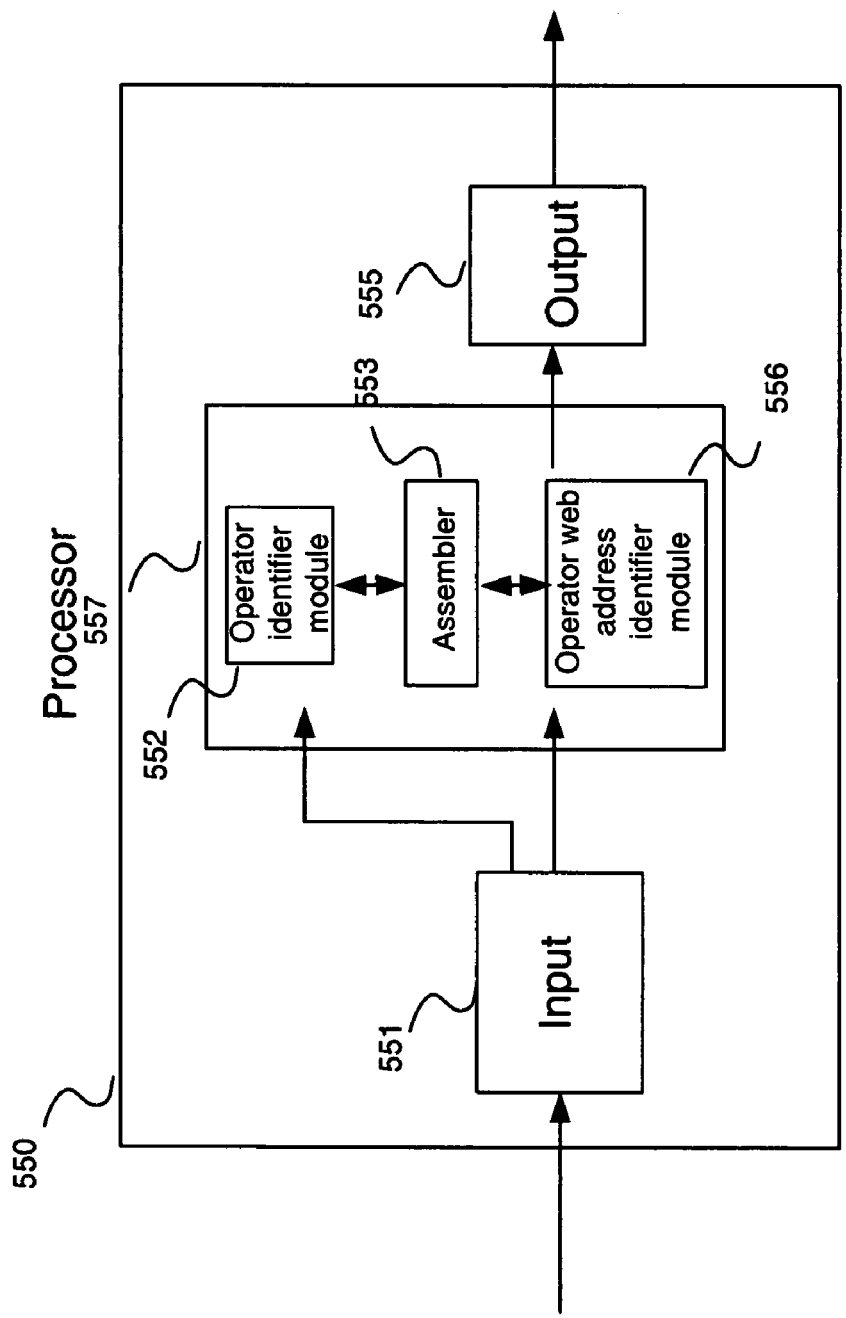
FIG. 7 illustrates a block diagram of an example of a structure of a transmitter in accordance with an aspect of the present invention.

FIG. 7 is a partial block diagram illustrating an example of a transmitter according to one aspect of the present invention. In this example, the transmitter 550 includes an input 551 for receiving data to be included in an ESG fragment for transmission. This data may be received from a variety of sources, for example, a service provider or broadcaster. The transmitter 550 may further include a processor 557 for assembling or processing an ESG fragment corresponding to a program or service. FIG. 7 illustrates the processor 557 as containing an operator identifier module 552, an assembler 553, and an operator web address identifier module 556. However, any of these components may be separate from the processor 557, if desired. Also any of the components illustrated in FIG. 7 may be rearranged or even skipped.

The operator identifier module 552 may determine identifier information for a mobile operator. For example the operator identifier module 552 may determine MCC and MNC or other operator specific identification information corresponding to a specific mobile operator. The mobile operator may, for example, provide a broadcast, program or service (e.g., Basic TV). In addition, a web address for a web page corresponding to the mobile operator may also be identified. For example, an operator web address identifier module 556 may identify a web address corresponding to a web address associated with the mobile operator. Thus, identifier information may be transmitted to the transmitter 550 and may be received at the input 551 of the transmitter 550. The identifier information may further be processed within the operator identifier module 552 to identify specific identifier information corresponding to the mobile operator (e.g., MCC and/or MNC) or may be processed within the operator web address identifier module 556 to identify a web page address corresponding to the mobile operator. Any of this information or portion thereof may be included in a service guide or ESG fragment.

In one example, the transmitter 550 processes the service guide to include a parameter, element or attribute indicating an identification of a mobile operator. In this example, the assembler 553 assembles a service guide for transmission over a network to a receiver or group of receivers. In this example, a parameter, element, or attribute (e.g., MCC and MNC) may be included in the service guide or ESG fragment indicating the identity of a corresponding mobile operator. The assembler 553 may create the ESG fragment including the parameter, element or attribute. This ESG fragment may be transmitted to a remote device such as a subscriber terminal or receiver.

In another example, the assembler may also include identifier information for the web address or web page associated with the mobile operator in the ESG fragment. Hence the ESG fragment may also include an address pointing to a web page for the mobile operator such that a user may access the web site conveniently.

The following table shows examples of identifier information for mobile operators and a web address associated with the mobile operators.

| MCC | MNC | Name | Mobile TV web address |
|-----|-----|------|------------------------|
| 244 | 3 | Dna | www.dnafinland.fi/mobiletv |
| 244 | 5 | Elisa | www.elisa.fi/mobiletv |
| 244 | 5 | MTV3 | www.mtv3.fi/mobiletv |
| 244 | 91 | SONERA | www.sonera.fi/mobiletv |

Thus, in this example, the operator identifier module 552 may include the MCC and/or MNC parameter in the ESG fragment via the assembler 553. Also, the operator web address identifier module 556 may include the mobile TV web address in the ESG fragment via the assembler 553. The ESG fragment may be output via output 555 to a receiver or group of receivers.

In another example, the transmitter 550 may transmit an ESG fragment containing identification information corresponding to a mobile operator such that a corresponding program or service may be filtered at a remote device such as a subscriber terminal or receiver. In this example, identification information corresponding to a mobile operator may be received at input 551 and may be processed at the processor 557. For example, the identification information may be identified by the operator identifier module 552 and may be assembled into an ESG fragment by the assembler 553. The ESG fragment thus created that contains the identification information corresponding to the mobile operator may be transmitted to a subscriber terminal or receiver.

In this example, any information associated with the corresponding program or service may be included in the ESG fragment transmitted by the transmitter such that other filtering methods may be employed at a subscriber terminal or receiver. For example, the assembler 553 of the transmitter 550 may include information in the ESG fragment such that a receiver or subscriber terminal may process the ESG information based on the information included in the ESG fragment. As an example to illustrate, the assembler 553 may include parental rating information in the ESG fragment for transmission via the output 555 to a subscriber terminal or receiver. As another example to illustrate, location based information (e.g., geographic information or local city area information) may be included in the ESG fragment by the assembler 553 for transmission to a subscriber terminal or receiver.

Figure 8:
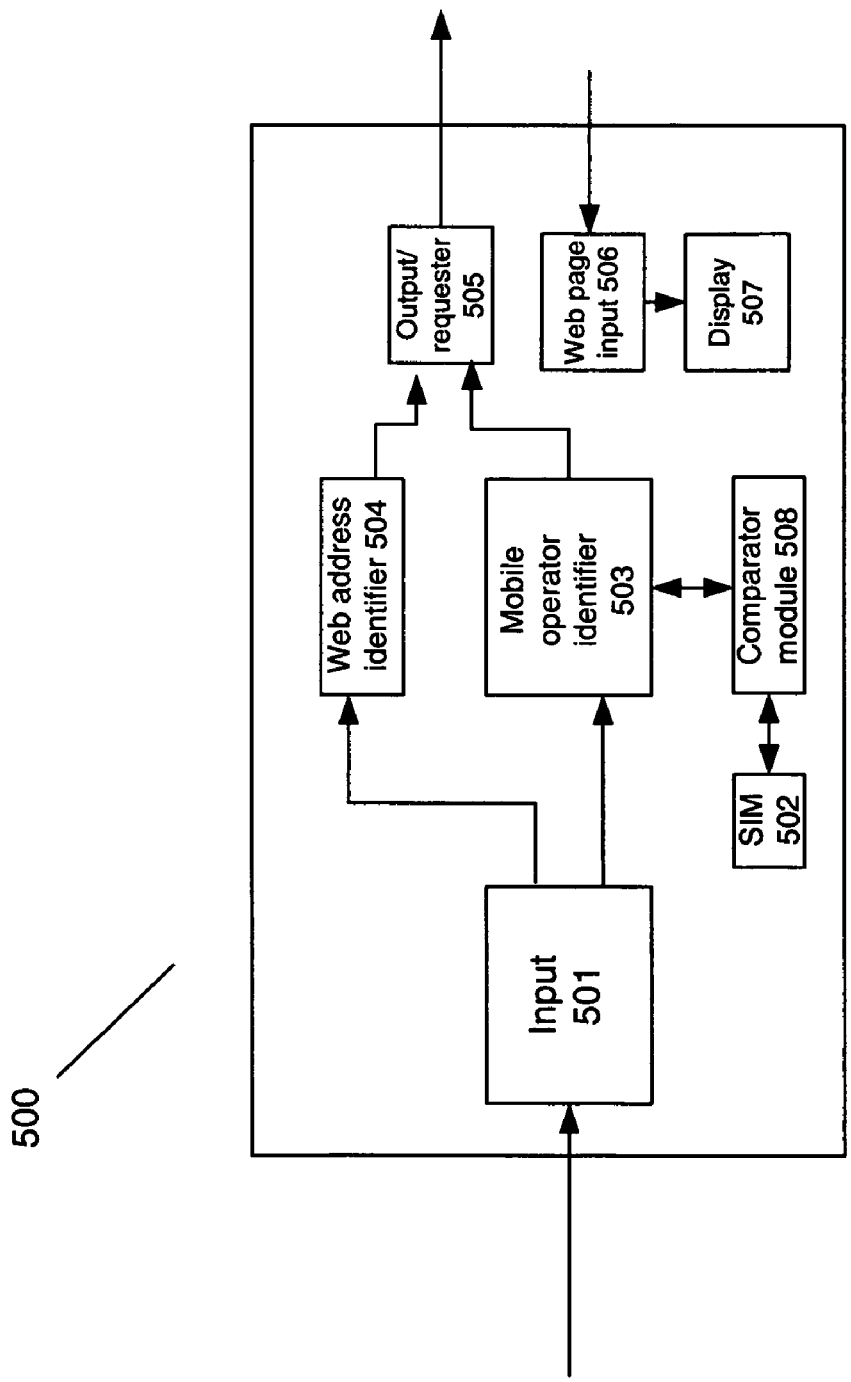
FIG. 8 illustrates a block diagram of an example of a structure of a subscriber terminal or receiver in accordance with an aspect of the present invention.

FIG. 8 illustrates an example of a subscriber terminal for receiving ESG data including mobile operator identification information and/or data for a web page corresponding to the mobile operator. In this example, ESG data or an ESG fragment is received at the subscriber terminal 500 at an input 501. The ESG data or fragment may contain mobile operator identification information, for example, MCC and/or MNC corresponding to the mobile operator. In addition, the ESG data or fragment may contain a web address corresponding to the mobile operator.

The ESG fragment is processed at the mobile operator identifier 503. The mobile operator identifier 503 identifies the mobile operator based on the received ESG data including the received mobile operator identification information. For example, the MCC and/or MNC received in the ESG fragment and corresponding to the mobile operator may be received and processed in the mobile operator identifier 503. The mobile operator identifier 503 may further access the SIM 502 in the subscriber terminal 500. Although the SIM 502 is illustrated in FIG. 8, any storage means or memory may be employed in the receiver at any location in the receiver. In this example, the SIM 502 (or any other memory location) may contain identification information (e.g., MCC and MNC) of the mobile operator. The Mobile operator identifier 503 compares the identification information received in the ESG with the identification information in the SIM 502 to identify the mobile operator. Also, the web address identifier 504 may receive the corresponding web address of the mobile operator. The web address may also be included in the received ESG data or fragment.

Hence, the mobile operator may be identified based on the identification information received in the ESG data or fragment and compared to corresponding identification information in the SIM 502. For example, filtering of received programs or services may be performed at the subscriber terminal or receiver based on the received identification information in the ESG data or fragment. The identification information received in the ESG fragment may be compared to stored identification information in the SIM 502. If a match is detected, then the corresponding program or service may be presented or displayed at the receiver. However, if a match is not detected between the received identification information (in the ESG fragment) and any stored identification information, then the corresponding program or service may be filtered such that the program or service is not provided at the receiver.

Also, the web address corresponding to the mobile operator may be received in the ESG fragment and may be identified in the web address identifier 504. Based on the identified mobile operator and the identified web address corresponding to the identified mobile operator, the requester 505 may request the web address. The requester 505 in this example may send a request to a web server (not shown) for the identified web address. The web page corresponding to the requested web address may be returned at the web page input 506. The web page may be displayed on a display 507.

In another example, the receiver or subscriber terminal 500 may receive an ESG fragment from a network at input 501. The ESG fragment may contain information such as operator identification information. Such operator information may include, for example, an MCC or MNC value of a corresponding operator or a name of the corresponding operator. The subscriber terminal or receiver 500 may receive the operator information in the ESG fragment and may, for example, filter corresponding program or services based on the information received in the ESG fragment. In one example, the receiver 500 may receive operator identification information including an MCC, MNC or name value and may compare the received operator information with information stored at the subscriber terminal or receiver 500. Based on comparing the received information with the stored information (e.g., if a match is found between a received operator identification information and a corresponding stored operator identification information), the subscriber terminal or receiver 500 may filter the corresponding program or service such that the program or service may be excluded from presentation or display at the receiver or subscriber terminal 500. In this example, the comparator module 508 compares the stored information (e.g., information stored in the SIM 502 in this example) with the received operator identification. The received operator identification information may be received via the input 501 in an ESG fragment and may be identified by the mobile operator identifier 503. Based on the comparison in the comparator module 508, the corresponding program or service may be filtered.

The corresponding program or service may be filtered based on any desired criteria. For example, the corresponding program or service may be filtered based on parental rating information. In this example, parental rating information may be transmitted to the receiver or subscriber terminal 500 and received at input 501. the identifier 503 may identify the parental rating information in the ESG fragment in this example. The comparator module 508 may compare the received parental rating information to stored information. In this example, the information is stored in a SIM 502 but may be stored anywhere in the subscriber terminal or receiver 500. Based on the comparison (e.g., if a match is found), the corresponding program or service may be filtered such that the program or service is not displayed or presented at the subscriber terminal or receiver.

In addition, programs or services may be filtered based on any number of other criteria. This may include, for example, presenting or displaying at the subscriber terminal or receiver 500 programs or services corresponding to a particular channel. As one example, the most watched TV channels may be selected such that the most watched TV channels may be presented at the subscriber terminal or receiver 500 via the output 505 based on filtering as described. In another example, programs or services may be filtered based on location of the information. This may be useful if a user desires information or programs or services only from a particular region or geographic location, for example.

Figure 9:
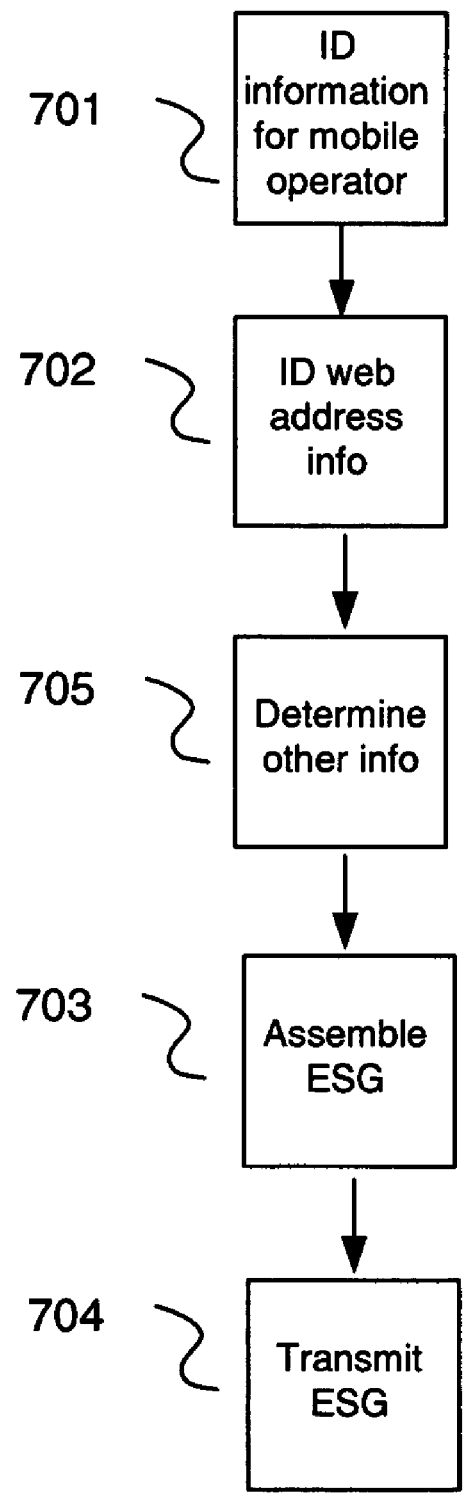
FIG. 9 illustrates a flow chart of an example of providing identification information for a mobile operator, filtering a program or service corresponding to an ESG fragment, or identifying a web address for a web page associated with the identified mobile operator in accordance with an aspect of the present invention.

FIG. 9 is a flowchart illustrating an example for transmitting an ESG fragment containing identification information for a mobile operator. In STEP 701, identifier information is determined for a mobile operator. For example MCC and/or MNC information corresponding to the mobile operator may be determined. In STEP 702, identifier information may be determined for a web address corresponding to the identified mobile operator. The identified web address may correspond to a web page corresponding to the mobile operator. In STEP 705, other information may be identified and included. This information may be used, for example, at a receiver or subscriber terminal for filtering of corresponding programs or services. For example, other information that may be identified or determined includes parental rating information, most frequently used channels, favorites, or location based information. In STEP 703, the identifier information or any other identified or determined information (e.g., parental rating, most watched, favorites, etc.) may be included in an ESG fragment. Identifier information may include parameters, elements, or attributes which may include MCC, MNC (for identifying the mobile operator). In one example, the identifier information further includes web address information. The identifier information may be included in the ESG fragment such that the web address information corresponds to the mobile operator identifier information (e.g., MCC and/or MNC or name) such that identifying the mobile operator may provide information on the corresponding web page address. Also the identification information or any other included information (e.g., parental ratings, etc.) may be used to filter the corresponding program or service at the subscriber terminal or receiver. In this example of filtering of programs or services, web address information may not be needed. The ESG fragment containing the identification information or any other included identified or determined information such as parental ratings, favorites, etc. (with or without web address information) may be transmitted to a receiver or group of receivers (STEP 704).

Figure 10:
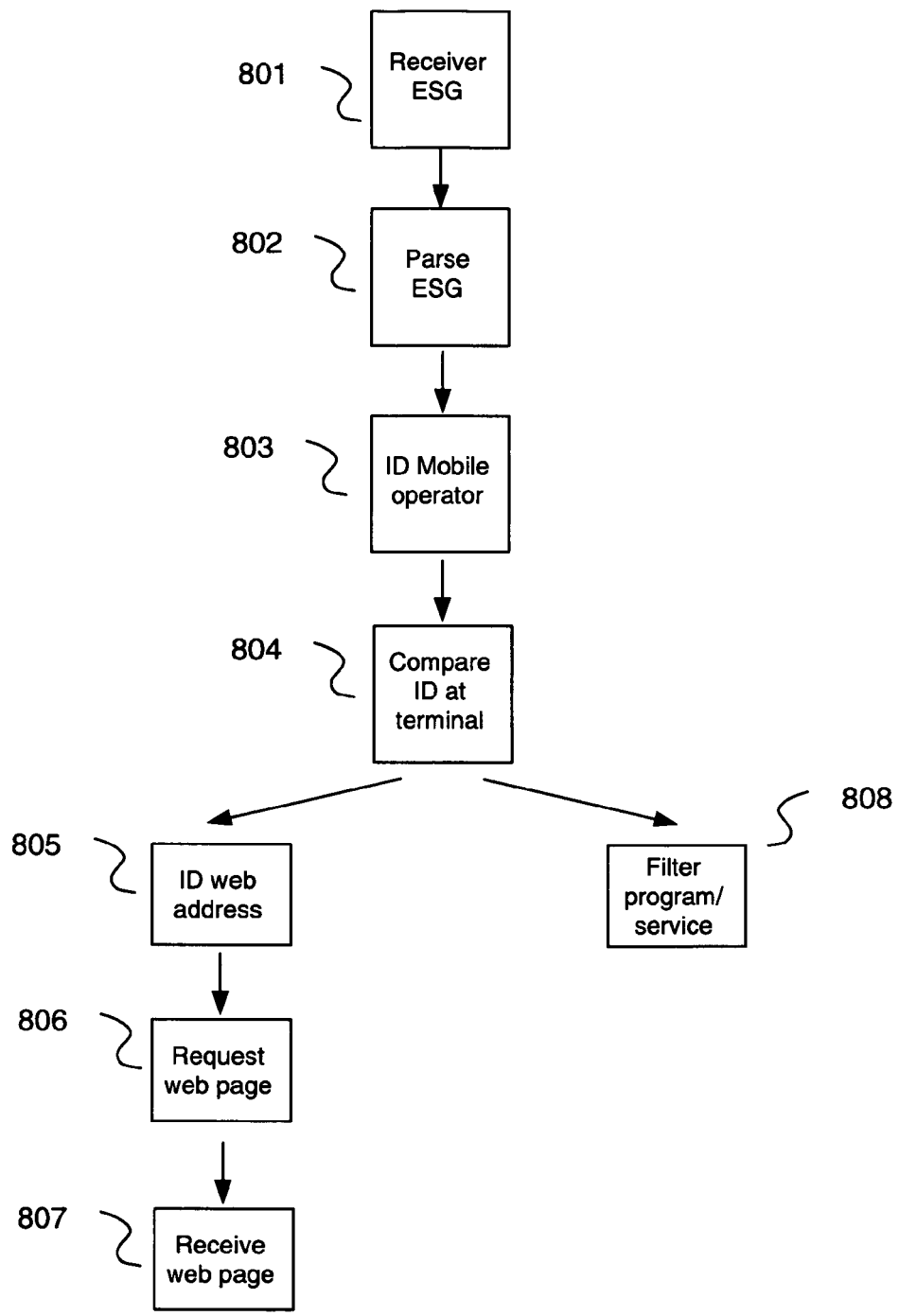
FIG. 10 illustrates a flow chart of an example of receiving ESG fragment information and metadata at a subscriber terminal in accordance with an aspect of the present invention.

FIG. 10 is a flowchart illustrating an example of identifying a web page corresponding to a mobile operator. In this example, an ESG fragment may be received from a remote source such as a transmitter or a service provider (STEP 801). The ESG may be parsed (STEP 802) such that identifier information may be identified within the ESG fragment. For example, an identifier may be identified within the ESG fragment that identifies a mobile operator associated with the ESG fragment. The identifier information that identifies the mobile operator may include, for example, MCC and/or MNC and/or a name for the mobile operator. Hence, the mobile operator may be identified (STEP 803). In one example, the identifier information may be compared (STEP 804) to stored identifier information in a SIM card at the receiver or terminal. If the identifier information received in the ESG fragment does not match any stored identifier information, then the corresponding program or service may be filtered at the subscriber terminal or receiver. In this example, the program or service is not provided (i.e., the program or service has been filtered) at the subscriber terminal or receiver (STEP 808).

In addition, a web page address associated with the identified mobile operator may be identified. This information may be included in the ESG fragment received at the subscriber terminal or receiver. For example, the ESG fragment may be received and the identifier information for the mobile operator (e.g., MNC and MCC codes) may be determined. The identifier information may be compared to stored identifier information in a SIM card in the subscriber terminal or receiver (STEP 804). Thus, the mobile operator may be identified at the subscriber terminal or receiver based on the received identifier information in the ESG fragment and the stored identifier information in the SIM card in the subscriber terminal or receiver. The ESG fragment received at the subscriber terminal or receiver may further contain a corresponding web address for a web page associated with the identified mobile operator (STEP 805). Hence, the web address may be further identified at the subscriber terminal or receiver based on the identified mobile operator.

Based on the identified web address, the subscriber terminal or receiver may request the web page (STEP 806). For example, the subscriber terminal or receiver may request the web page from a web server in a network. The corresponding web page may be returned to the subscriber terminal or receiver which may receive the web page (STEP 807) and display the web page.

The embodiments herein include any feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques.

We claim:

1. A method comprising:
    causing, at least in part, reception, via a broadcasting network, of a plurality of sets of electronic service guide data at a subscriber terminal, each set of the electronic service guide data corresponding to a program or service and including at least one first parameter in metadata of the service guide data for identifying a mobile television operator, each mobile television operator offering a plurality of programs or services based upon authorization by the mobile television operator to one or more subscriber terminals and via a mobile infrastructure of the mobile television operator;
    causing, at least in part, reception from a memory connected to the subscriber terminal a plurality of second parameters each identifying a corresponding mobile television operator;
    comparing the at least one first parameter to the second parameters at the subscriber terminal per program or per service; and
    identifying the mobile television operator based on the comparison, wherein
    each set of electronic service guide (ESG) data comprises filtering information including filtering at least a program or service associated with the service guide data by the identifier thereby displaying or preventing display of the program or service per mobile television operator.

2. The method of claim 1, wherein each set of electronic service guide (ESG) data further includes a web address corresponding to the mobile television operator, and the method further comprising requesting a web page corresponding to the web address via a data communication network, that is different from the broadcasting network.

3. The method of claim 2, wherein each set of electronic service guide (ESG) data further includes a web address corresponding to the mobile television operator, and the method further comprising receiving the web page and displaying the web page on the subscriber terminal.

4. The method of claim 1 wherein the at least first parameter comprises one of a Mobile Network Code (MNC) and Mobile Country Code (MCC).

5. The method of claim 1, further comprising: filtering at the subscriber terminal at least a program or service associated with the service guide data based on the comparison, thereby determining whether to display at the subscriber terminal the at least one program and service.

6. The method of claim 5, wherein the filtering comprises preventing display of the program or service associated with the service guide data if the at least first parameter in the service guide data does not match the second parameters.

7. The method of claim 5, wherein the filtering comprises displaying the at least one program or service associated with the service guide data only if the at least one first parameter received in the service guide data matches one of the second parameters.

8. The method of claim 1, wherein each set of electronic service guide (ESG) data comprises filtering information corresponding to a program or service associated with the service guide data.

9. The method of claim 8, wherein the filtering information includes parental rating information, most used channels, favorites, location based information, or a combination thereof.

10. The method of claim 5, further comprises displaying the program or service based on the comparison.

11. The method of claim 10, wherein the displaying comprises displaying the program or service if a match is detected between the at least one first parameter and one of the second parameters at the subscriber terminal.

12. The method of claim 10, wherein the displaying comprises displaying the program or service if a match is not detected between the at least first parameter and the second parameters at the subscriber terminal.

13. The method of claim 1, wherein the memory connected to the subscriber terminal is a subscriber identification module (SIM) card coupled to the subscriber terminal.

14. An apparatus comprising:
    at least one processor; and
    at least one memory including computer program code,
    the at least one memory and the computer program code configured to, with the at least one processor, cause the apparatus to perform at least the following,
    receive via a broadcasting network a plurality of sets of electronic service guide data at a subscriber terminal, each set of the electronic service guide data corresponding to a program or service and including at least one first parameter in metadata of the service guide data for identifying a mobile television operator, each mobile television operator offering a plurality of programs or services based upon authorization by the mobile television operator to one or more subscriber terminals and via a mobile infrastructure of the mobile television operator;
    receive from a memory connected to the apparatus a plurality of second parameters each identifying a corresponding mobile television operator;
    compare the at least one first parameter to the second parameters per program or per service; and
    identify the mobile television operator based on the comparison, wherein
    each set of electronic service guide (ESG) data comprises filtering information including filtering at least a program or service associated with the service guide data by the identifier thereby displaying or preventing display of the program or service per mobile television operator.

15. The apparatus of claim 14, wherein each set of electronic service guide (ESG) data further includes a web address corresponding to the mobile television operator, and the apparatus is further caused to request a web page corresponding to the web address via a data communication network that is different from the broadcasting network.

16. The apparatus of claim 14 wherein the at least first parameter comprises one of a Mobile Network Code (MNC) and Mobile Country Code (MCC).

17. The apparatus of claim 14 wherein the second parameter is stored in a subscriber identification module in the apparatus.

18. The apparatus of claim 14, wherein the apparatus is further caused to identify the mobile operator and filter at least one program or service associated with the service guide data based on the comparison, in order to determine whether to display at the subscriber terminal the at least one program and service.

19. The apparatus of claim 18, wherein the apparatus is further caused to prevent display of the program or service associated with the service guide data if the at least first parameter in the service guide data does not match the second parameters.

20. The apparatus of claim 18, wherein the apparatus is further caused to display the at least one program or service associated with the service guide data only if the at least one first parameter received in the service guide data matches one of the second parameters.

21. The apparatus of claim 14, wherein each set of electronic service guide (ESG) data comprises filtering information corresponding to a program or service associated with the service guide data.

22. The apparatus of claim 21, wherein the filtering information includes parental rating information, most used channels, favorites, location based information, or a combination thereof.

23. The apparatus of claim 18, wherein the apparatus is further caused to display the program or service based on the comparison.

24. The apparatus of claim 23, wherein the apparatus is further caused to display the program or service if a match is detected between the at least one first parameter and one of the second parameters at the subscriber terminal.

25. The apparatus of claim 23, wherein the apparatus is further caused to display the program or service if a match is not detected between the at least first parameter and the second parameters at the subscriber terminal.

26. The apparatus of claim 14, wherein the apparatus is further caused to receive the web page and display the web page on the subscriber terminal.

27. The apparatus of claim 15, wherein each set of electronic service guide (ESG) data further includes a web address corresponding to the mobile television operator, and the apparatus is further caused to provide the web page address in a purchase channel containing a media title, the media title comprising a zipped HTML web page corresponding to the mobile television operator.

28. The apparatus of claim 14, wherein the memory connected to the subscriber terminal is a subscriber identification module (SIM) card coupled to the subscriber terminal.

29. A non-transitory computer-readable storage medium carrying one or more sequences of one or more instructions which, when executed by one or more processors, cause an apparatus to perform at least the following steps:
receiving via a broadcasting network a plurality of sets of electronic service guide data at a subscriber terminal, each set of the electronic service guide data corresponding to a program or service and including at least one first parameter in metadata of the service guide data for identifying a mobile television operator, each mobile television operator offering a plurality of programs or services based upon authorization by the mobile television operator to one or more subscriber terminals and via a mobile infrastructure of the mobile television operator;
receiving from a memory connected to the apparatus a plurality of second parameters each identifying a corresponding mobile television operator;
comparing the at least one first parameter to the second parameters per program or per service; and
identifying the mobile television operator based on the comparison, wherein
each set of electronic service guide (ESG) data comprises filtering information including filtering at least a program or service associated with the service guide data by the identifier thereby displaying or preventing display of the program or service per mobile television operator.

30. The non-transitory computer-readable storage medium of claim 29, wherein each set of electronic service guide (ESG) data further includes a web address corresponding to the mobile television operator, and the apparatus is caused to further perform: receiving the web page and displaying the web page.

31. The non-transitory computer-readable storage medium of claim 29, wherein the memory connected to the subscriber terminal is a subscriber identification module (SIM) card coupled to the subscriber terminal.

* * * * *